(12) United States Patent
Carter et al.

(10) Patent No.: US 8,463,456 B2
(45) Date of Patent: Jun. 11, 2013

(54) MINIMIZING AGGREGATE COOLING AND LEAKAGE POWER

(75) Inventors: John B. Carter, Austin, TX (US); Elmootazbellah N. Elnozahy, Austin, TX (US); Malcolm S. Ware, Austin, TX (US); Wei Huang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/726,792

(22) Filed: Mar. 18, 2010

(65) Prior Publication Data
US 2011/0231030 A1    Sep. 22, 2011

(51) Int. Cl.
    *G05D 23/00* (2006.01)
(52) U.S. Cl.
    USPC .............................................. 700/300; 700/3
(58) Field of Classification Search
    USPC ...................................................... 700/300, 3
    See application file for complete search history.

(56) References Cited

U.S. PATENT DOCUMENTS

| | | | |
|---|---|---|---|
| 6,643,128 B2 | 11/2003 | Chu et al. |
| 7,167,015 B2 | 1/2007 | Borkar |
| 7,321,942 B2 | 1/2008 | Flautner et al. |
| 7,430,672 B2 | 9/2008 | Rotem et al. |
| 7,533,003 B2 | 5/2009 | Floyd et al. |
| 7,644,051 B1 | 1/2010 | Moore et al. |
| 7,689,839 B2 | 3/2010 | Uguen et al. |
| 7,840,825 B2 | 11/2010 | Altevogt et al. |
| 7,904,287 B2 | 3/2011 | Lefurgy et al. |
| 7,917,772 B1 | 3/2011 | Koniaris et al. |
| 7,971,073 B2 | 6/2011 | Hsu et al. |
| 8,041,521 B2 | 10/2011 | Bletsch et al. |
| 8,214,663 B2 | 7/2012 | Floyd et al. |
| 2004/0206101 A1 | 10/2004 | Bash et al. |
| 2005/0273208 A1 | 12/2005 | Yazawa et al. |
| 2006/0052970 A1 | 3/2006 | Arabi et al. |
| 2006/0168571 A1 | 7/2006 | Ghiasi et al. |
| 2006/0178764 A1 | 8/2006 | Bieswanger et al. |
| 2008/0234953 A1 | 9/2008 | Ignowski et al. |
| 2008/0278905 A1 | 11/2008 | Artman et al. |
| 2009/0138219 A1 | 5/2009 | Bletsch et al. |

(Continued)

FOREIGN PATENT DOCUMENTS

WO    WO2005/017468 A2    2/2005

OTHER PUBLICATIONS

U.S. Appl. No. 13/288,346, 1 page.

(Continued)

*Primary Examiner* — Carlos Ortiz Rodriguez
(74) *Attorney, Agent, or Firm* — Francis Lammes; Stephen J. Walder, Jr.; Eustus D. Nelson (57) ABSTRACT

A mechanism is provided for minimizing system power in a data processing system. A management control unit determines whether a convergence has been reached in the data processing system. If convergence fails to be reached, the management control unit determines whether a maximum fan flag is set to indicate that a fan is operating at a maximum speed. Responsive to the maximum fan flag failing to be set, a thermal threshold of the data processing system is either increased or decreased and thereby a fan speed of the data processing system is either increased or decreased based on whether the system power of the data processing system has either increased or decreased and based on whether a temperature of the data processing system has either increased or decreased. Thus, a new thermal threshold and a new fan speed are formed. The process is then repeated until convergence has been met.

20 Claims, 6 Drawing Sheets

U.S. PATENT DOCUMENTS

| | | | |
|---|---|---|---|
| 2009/0259869 | A1 | 10/2009 | Naffziger |
| 2009/0296342 | A1 | 12/2009 | Matteson et al. |
| 2010/0049995 | A1 | 2/2010 | Casey et al. |
| 2010/0218029 | A1 | 8/2010 | Floyd et al. |
| 2010/0268930 | A1 | 10/2010 | Bose et al. |
| 2010/0268974 | A1 | 10/2010 | Floyd et al. |
| 2010/0268975 | A1 | 10/2010 | Bose et al. |
| 2011/0231030 | A1 | 9/2011 | Carter et al. |

OTHER PUBLICATIONS

Wang, Zhikui et al., "Optimal Fan Speed Control for Thermal Management of Servers", Proceedings of the ASME/Pacific Rim Technical Conference and Exhibition on Packaging and Integration of Electronic and Photonic Systems, MEMS, and NEMS InterPACK'09, San Francisco, California, Jul. 19-23, 2009, 11 pages.

Economou, Dimitris et al., "Full-System Power Analysis and Modeling for Server Environments", Stanford University, Workshop on Modeling Benchmarking and Simulation, 2006, 8 pages.

Pakbaznia, Ehsan et al., "Minimizing Data Center Cooling and Server Power Costs", Proceedings of the 14th ACM/IEEE International Symposium on Low Power Electronics and Design, 2009, pp. 145-150.

USPTO U.S. Appl. No. 13/079,842.
USPTO U.S. Appl. No. 13/488,822.
USPTO U.S. Appl. No. 13/608,285.
USPTO U.S. Appl. No. 12/424,158.
USPTO U.S. Appl. No. 12/424,161.
USPTO U.S. Appl. No. 12/749,179.

"Use of Instrumented Activity Counts to Identify Relevant Code Points for Performance Analysis and Tuning", www.IP.com No. IPCOM000184039D, Jun. 9, 2009, 7 pages.

Jacobson, Hans et al., "Abstraction and Microarchitecture Scaling in Early-Stage Power Modeling", IEEE, 2011, pp. 394-405.

Joseph, Russ et al., "Run-time Power Estimation in High-Performance Microprocessors", Proceedings of the International Symposium on Low Power Electronics and Design (ISLPED), Aug. 6-7, 2002, 6 pages.

Lee, Seung Eun et al., "A variable frequency link for a power-aware network-on-chip (NoC)", Integration, The VLSI Journal, v. 42, pp. 479-485, Jan. 2009, pp. 479-485.

Powell, Michael D. et al., "CAMP: A Technique to Estimate Per-Structure Power at Run-time using a Few Simple Parameters", IEEE, 2008, pp. 289-300.

Shin, Donghwa et al., "Energy-Optimal Dynamic Thermal Management for Green Computing", ACM, ICCAD '09, Nov. 2-5, 2009, 6 pages.

Snowden, David, "Operating System Directed Power Management", Thesis, School of Computer Science and Engineering at the University of New South Wales, Mar. 4, 2010, 237 pages.

Zhang, Lide et al., "Process Variation Characterization of Chip-Level Multiprocessors", 2009 46th ACM/IEEE Design Automation Conference (DAC), 2009, pp. 694-697.

International Search Report and Written Opinion dated Jan. 25, 2013 for International Application No. PCT/US2012/062919, 12 pages.

MINIMIZING AGGREGATE COOLING AND LEAKAGE POWER

BACKGROUND

The present application relates generally to an improved data processing apparatus and method and more specifically to mechanisms for minimizing aggregate cooling and leakage power.

As computer and other electronic systems have increased performance over time, the power consumed to enable the performance has increased dramatically. Until recently, power management has mostly been an issue associated with the max temperatures components or subassemblies may experience. However, a system behavior that requires significant power during periods of high production, but requires very little power consumption during idle or low production periods, will tend to experience large variations in temperature depending upon the nature of the thermal cooling paths and the workload demands on the system. These temperature variations may cause failures due to mechanical stress and strain induced fatigue for structures that are composed of materials with varying coefficients of thermal expansion (CTE).

When a system is operating at a high temperature, more power is consumed, primarily due to increased thermally induced parasitic power, such as leakage power. In current systems, leakage power is controlled by setting a thermal threshold to approximately 70 degrees Celsius. When the temperature is exceeded, these systems turn to increasing fan speed, decreasing voltage, decreasing frequency, and/or decreasing workload, and when the temperature falls below the threshold, these systems decrease fan speed, increase voltage, increase frequency, and/or increasing workload. Such changes may lead to failures due to mechanical stress and strain induced fatigue for structures as previously described.

SUMMARY

In one illustrative embodiment, a method, in a data processing system, is provided for minimizing system power in the data processing system. The illustrative embodiment determines whether a convergence has been reached in the data processing system. The illustrative embodiment determines whether a maximum fan flag is set to indicate that a fan is operating at a maximum speed in response to convergence failing to be reached. The illustrative embodiment either increases or decreases a thermal threshold of the data processing system and thereby a fan speed of the data processing system based on whether the system power of the data processing system has either increased or decreased and based on whether a temperature of the data processing system has either increased or decreased thereby forming a new thermal threshold and a new fan speed in response to the maximum fan flag failing to be set to indicate that the fan is operating at the maximum speed. The illustrative embodiment determines whether the convergence has been reached in the data processing system using the new thermal threshold. Responsive to convergence failing to be reached using the new thermal threshold, the illustrative embodiment repeats the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to be set to indicate that the fan is operating at the maximum speed.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for minimizing system power without performance penalty. The mechanism adjusts the systems thermal threshold at run time in order to find a fan speed at which system power is minimized without thermal violations. The mechanism monitors the aggregate system power $P_{total}$ of system power and cooling fan power for a predetermined time period. At the end of each time period, if $P_{total}$ decreases, then the mechanism may increase the current thermal threshold and by increasing the thermal threshold, indirectly decrease the fan speed to achieve more power savings. If, at the end of the time period, $P_{total}$ increases, meaning reaching a point where leakage power increase outruns fan power savings, then the mechanism may decrease the thermal threshold and by decreasing the thermal threshold, indirectly increase fan speed. Once $P_{total}$ stabilizes, such that there is nominal change in $P_{total}$ and virtually no performance penalty, then the mechanism leaves the thermal threshold and, thus, the fan speed at the current setting indicating optimal settings have been identified that minimize system power without performance penalty. Thus, the illustrative embodiments minimize system power by exploiting that relationship between fan power and leakage power.

Figure 1:
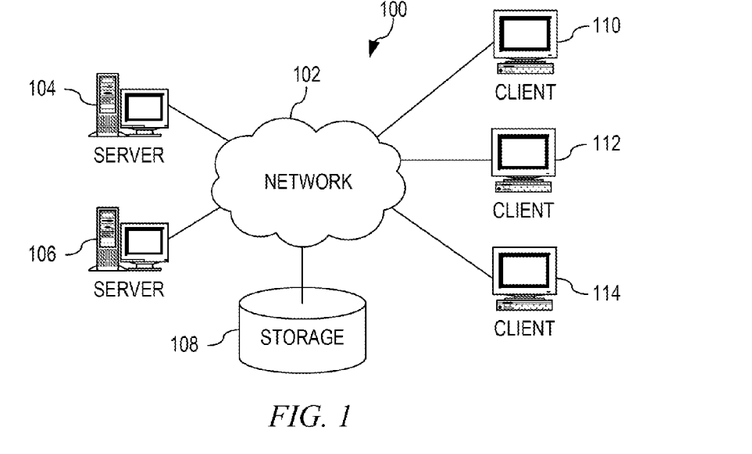
FIG. 1 depicts a pictorial representation of an example distributed data processing system in which aspects of the illustrative embodiments may be implemented.
Figure 2:
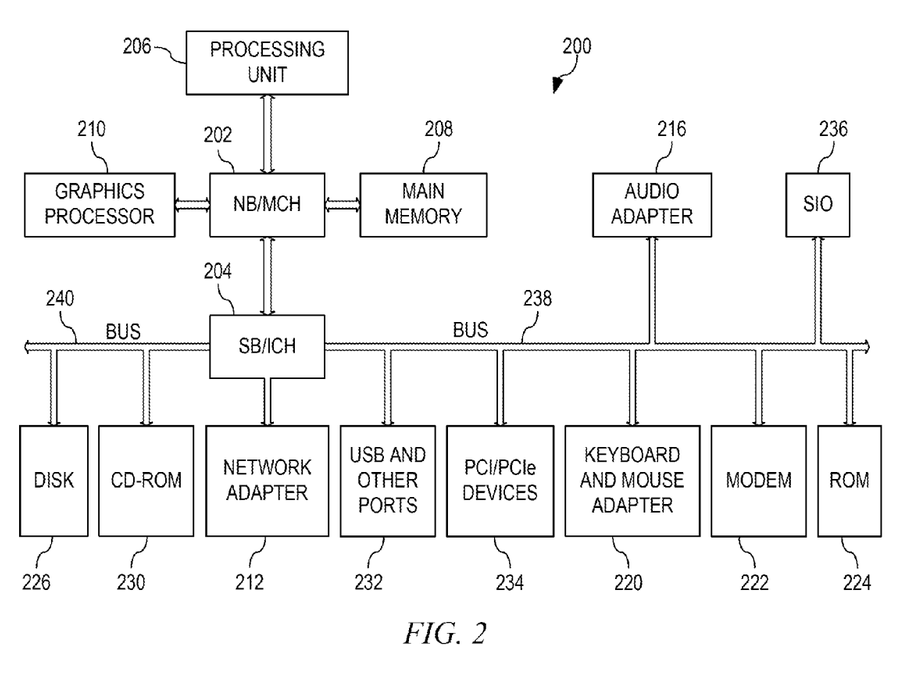
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that minimizes system power without performance penalty, this is only an example and is not intended to state or imply any limitation with regard to the features of the present invention. To the contrary, the illustrative embodiments are intended to include distributed data processing environments and embodiments in which system power may be minimized without performance penalty.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NR/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super 110 (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for minimizing system power without performance penalty. The mechanism monitors the aggregate system power $P_{total}$ of system power and cooling fan power for a predetermined time period. At the end of each time period, the mechanism adjusts a thermal threshold and, thus, the fan speed in order to achieve more power savings. Once optimal settings for the thermal threshold and fan speed have been identified, then the mechanism leaves the thermal threshold and, thus, the fan speed at the current settings, such that system power is minimized without performance penalty.

Figure 3:
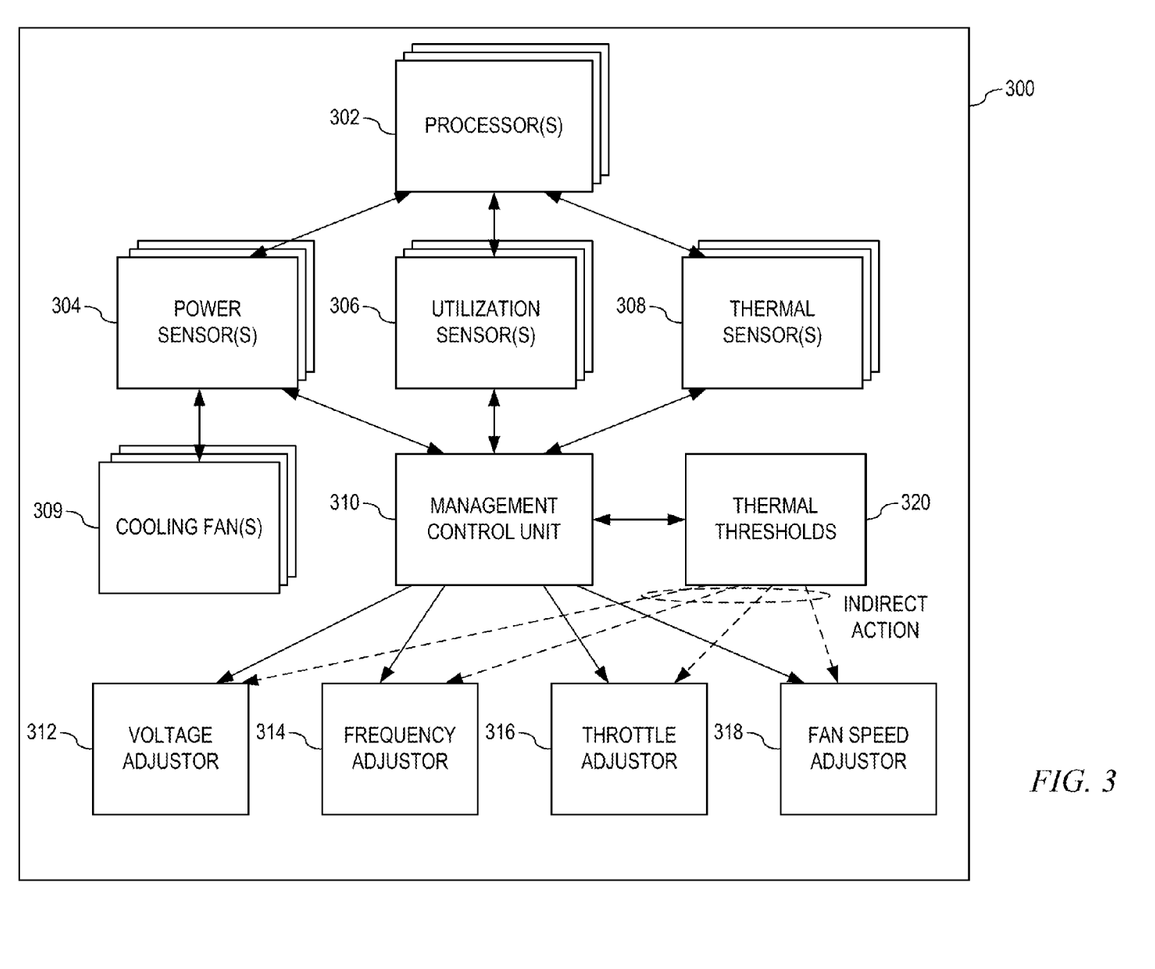
FIG. 3 depicts a functional block diagram of a mechanism that minimizes system power without performance penalty in accordance with an illustrative embodiment.

FIG. 3 depicts a functional block diagram of a mechanism that minimizes system power without performance penalty in accordance with an illustrative embodiment. Data processing system 300 may comprise one or more of processors 302 that have associated sensors, such as power sensors 304, utilization sensors 306, thermal sensors 308, or the like. Power sensors 304 monitor the power consumed by each of processors 302 and each of cooling fans 309 and send the detected system power usage values to management control unit 310. Likewise, utilization sensors 306 may monitor the workload performed by each of processors 302 and send detected utilization values to management control unit 310. Similarly, thermal sensors 308 may be positioned adjacent to areas within data processing system 300 that typically experience the greatest variance in temperature during the execution of most applications, such as adjacent to processor 302. Thermal sensors 308 monitor the temperature associated with these areas and send the detected temperature values to management control unit 310. Additionally, thermal sensors may be directed to measuring both an ambient temperature of data processing system 300 as well as extreme localized temperature areas of data processing system 300, such as those used in the illustrative embodiments, which may comprise: adjacent to each processing unit, memory flow controller, or the like.

Management control unit 310 may use the system power usage values, utilization values, and temperature values to control (directly or indirectly) the voltage, frequency, workload, and/or cooling associated with each of processors 302 using mechanisms such as voltage adjustor 312, frequency adjustor 314, throttle adjustor 316, and fan speed adjustor 318, respectively. That is, the illustrative embodiments may indirectly control fan speed by adjusting one or more of thermal thresholds 320 or the illustrative embodiments may directly control fan speed through the use of signals direct to fan speed adjustor 318. Management control unit 310 may also use one or more thermal thresholds 320 to indirectly cause an adjustment in one or more of the voltage, frequency, workload, and cooling associated with each of processors 302 based on any one of the detected power usage values, utilization values, and temperature values.

In this illustrative embodiment, management control unit 310 retrieves a current high thermal threshold T from thermal thresholds 320. In order to determine an optimal high thermal threshold and fan power setting that minimizes system power without performance penalty, management control unit 310 increases the high thermal threshold by a thermal increment $\Delta T$. For a predetermined time interval, management control unit 310 determines whether the increase in the high thermal threshold causes the fan speed(s) of cooling fans 309 to change as detected by power sensors 304. Fan speed is linear to fan power; thus, changes in fan speed may be determined by the power consumed by the fan. Management control unit 310 checks the fan speed because change in fan speed may not be directly controlled. That is, fan speed may be indirectly controlled by changing the high thermal threshold. Therefore, checking fan speed change is necessary to make sure that indirect mechanism actually occurred in order to change the fan speed. If the mechanism fails to change fan speed, the illustrative embodiment provides for an error recovery process to endure then change in the high thermal threshold properly causes the fan speed change.

The fan speed(s) may either increase, decrease, or stay the same; however, by increasing the high thermal threshold, the fan speeds should decrease as the amount of cooling required has decreased through increasing the high thermal threshold. If management control unit 310 determines a change in fan speed, then management control unit 310 waits for the temperature of data processing system 300 to stabilize as determined by comparing the information detected by thermal sensors 308. If management control unit 310 determines that the fan speed has not change, then management control unit 310 determines if the fan speed is greater than a predetermined value. If management control unit 310 determines that the fan speed is not above the predetermined value, then management control unit 310 performs an error recovery process to ensure that the increase in the high thermal threshold indirectly caused the fan speed to increase. Once the error recovery process is performed, then management control unit 310 determines whether the increase in the high thermal threshold causes the fan speed(s) of cooling fans 309 to change as detected by power sensors 304.

Once the temperature of data processing system 300 stabilizes or if management control unit 310 determines that fan speed is above the predetermined value, management control unit 310 retrieves a current aggregated power measurement P from power sensors 304. Management control unit 310 then sets the current aggregated system power measurement P equal to $P_{cur}$, which is a stored value used for later comparison, and again increases the high thermal threshold by another thermal increment $\Delta T$. For another predetermined time interval, management control unit 310 determines whether the additional increase in the high thermal threshold causes the fan speed(s) of cooling fans 309 to change as detected by power sensors 304. Again, the fan speed(s) may either increase, decrease, or stay the same; however, by additionally increasing the high thermal threshold, the fan speeds should decrease as the amount of cooling required has decreased through the additional increase in the high thermal threshold. If management control unit 310 determines a change in fan speed, management control unit 310 sets the maximum fan flag, max_fan, to false, 0, or the like, and then management control unit 310 waits once again for the temperature of data processing system 300 to stabilize as determined by comparing the information detected by thermal sensors 308.

If at this point the fan speed does not change in response to increasing the high thermal threshold, then management control unit 310 determines if the fan speed is greater than a predetermined value. If management control unit 310 determines that the fan speed is not above the predetermined value, then management control unit 310 performs an error recovery process to ensure that the increase in the high thermal threshold indirectly caused the fan speed to increase. Once the error recovery process in performed, then management control unit 310 determines whether the increase in the high thermal threshold causes the fan speed(s) of cooling fans 309 to change as detected by power sensors 304. If management control unit 310 determines that the fan speed is above the predetermined value, management control unit 310 sets a maximum fan flag, max_fan, to true, 1, or the like, and then management control unit 310 waits for the temperature of data processing system 300 to stabilize as determined by comparing the information detected by thermal sensors 308. Once the temperature of data processing system 300 stabilizes, management control unit 310 sets the $P_{cur}$ equal to a $P_{prev}$ value and retrieves a new current aggregated power measurement P from power sensors 304. Management control unit 310 then sets $P_{cur}$ equal to the new current aggregated system power measurement P and determines a change in system power, $\Delta P_{cur}$, by subtracting $P_{prev}$ from $P_{cur}$. Management control unit 310 then determines whether a convergence has been reached such that system power has been minimized without any performance penalty. Management control unit 310 determines whether convergence has been reached by determining whether an absolute value of change in system power $\Delta P_{cur}$ is greater than or equal to a predefined value identifying optimal system power settings as well as determining that change in system power $\Delta P_{cur}$ does not indicate an increase in system power.

If both conditions are met, then management control unit 310 waits for a predetermined time period before retrieving a new current aggregated system power measurement P from power sensors 304 and performing the same previous steps in order to ensure that convergence has been reached such that system power has been minimized without any performance penalty. If either one of the conditions are not met or if a change in data processing system 300, such as a change in workload that results in $\Delta P_{cur}$ being greater than the convergence criterion, causes either of the previously met conditions to no longer be met, then management control unit 310 determines if the maximum fan flag, max_fan, is set to true, 1, or the like, if so, management control unit 310 once again retrieves a new current aggregated system power measurement P from power sensors 304, which is set equal to $P_{cur}$, and again increases the high thermal threshold by another thermal increment $\Delta T$. Management control unit 310 then repeats the above process to determine whether the additional increase in the high thermal threshold causes the fan speed(s) of cooling fans 309 to change as detected by power sensors 304, thereby causing convergence.

If either one of the conditions are not met or if a change in data processing system 300 causes either of the previously met conditions to no longer be met and the maximum fan flag, max_fan, is set to false, 0, or the like, then management control unit 310 determines which of the four conditions identified in FIGS. 4A-4D are met by the current change in system power and the current change in temperature as detected by power sensors 304 and thermal sensors 308. That is, if management control unit 310 determines that aggregate system power is increasing and temperature is increasing from the time at which $P_{prev}$ was obtained to the time at which $P_{cur}$ was obtained, then management control unit 310 decreases the high thermal threshold in thermal thresholds 320 which increases the fan speed using fan speed adjustor 318. If management control unit 310 determines that aggregate system power is increasing and temperature is decreasing from the time at which $P_{prev}$ was obtained to the time at which $P_{cur}$ was obtained, then management control unit 310 increases the high thermal threshold in thermal thresholds 320 which decreases the fan speed using fan speed adjustor 318.

If management control unit 310 determines that aggregate system power is decreasing and temperature is increasing from the time at which $P_{prev}$ was obtained to the time at which $P_{cur}$ was obtained, then management control unit 310 increases the high thermal threshold in thermal thresholds 320 which decreases the fan speed using fan speed adjustor 318. If management control unit 310 determines that aggregate system power is decreasing and temperature is decreasing from the time at which $P_{prev}$ was obtained to the time at which $P_{cur}$ was obtained, then management control unit 310 decreases the high thermal threshold in thermal thresholds 320 which increases the fan speed using fan speed adjustor 318. After adjusting the thermal threshold and fan speed, management control unit 310 once again retrieves a new current aggregated system power measurement P from power sensors 304, which is set equal to P, and repeats the above process to determine whether the additional increase in the high thermal threshold causes the fan speed(s) of cooling fans 309 to change as detected by power sensors 304, thereby causing convergence.

Management control unit 310 may be applied for both system power and thermal management for each critical component (or subsystem on a chip, as with multi-core processors) so that management control system 310 may directly target the thermal and system power boundaries and hold to them. While management control unit 310 is shown to use values from power sensors 304, utilization sensors 306, and thermal sensors 308 to control fan speed adjustor 318, the illustrative embodiments recognize that any type of sensor may provide values to management control unit 310 and management control unit 310 may use any type of adjustor to mitigate the effects of delamination of organic packages in a data processing system due to thermal stress while allowing as much system power as possible to be saved in the data processing system, such as using voltage adjustor 312, frequency adjustor 314, and/or throttle adjustor 316

Figure 4A:
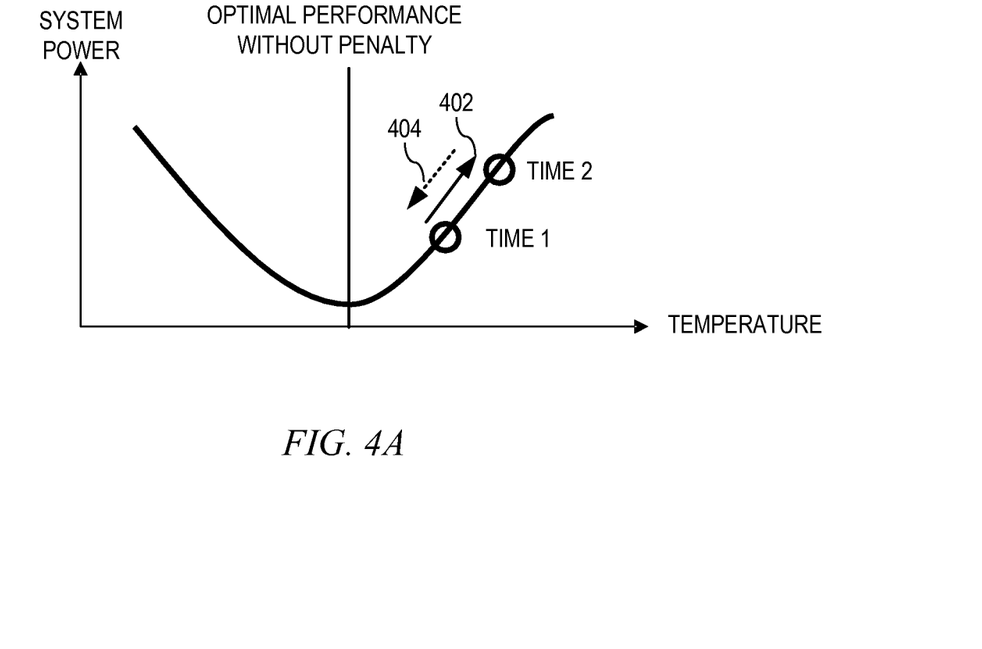
FIGS. 4A-4D depict exemplary graphs illustrating fluctuations in power and temperature in accordance with an illustrative embodiment.
Figure 4B:
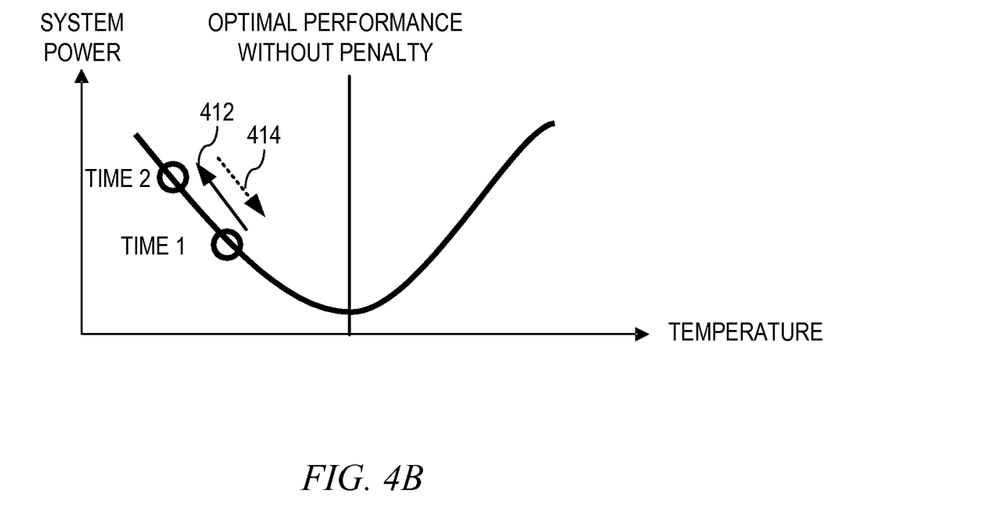

FIGS. 4A-4I) depict exemplary graphs illustrating fluctuations in system power and temperature in accordance with an illustrative embodiment. FIG. 4A depicts a graph where aggregate system power, $P_{total}$, is increasing and temperature is increasing from Time 1 to Time 2 as shown by arrow 402. The condition illustrated in FIG. 4A may be caused by either an increase in workload, inadequate cooling, or the like, which may result in more leakage power. Thus, the mechanism of the illustrative embodiment would decrease the thermal threshold and, by decreasing the thermal threshold, indirectly increase the fan speed in order to reduce power as is shown by arrow 404. FIG. 4B depicts a graph where aggregate system power, $P_{total}$, is increasing and temperature is decreasing from Time 1 to Time 2 as shown by arrow 412. The condition illustrated in FIG. 4B may be caused by either workload increase, over cooling, or the like, which may result in an increase in fan power and/or decrease in leakage power. Thus, the mechanism of the illustrative embodiment would increase the thermal threshold and, by increasing the thermal threshold, indirectly decrease the fan speed in order to reduce power as is shown by arrow 414.

Figure 4C:
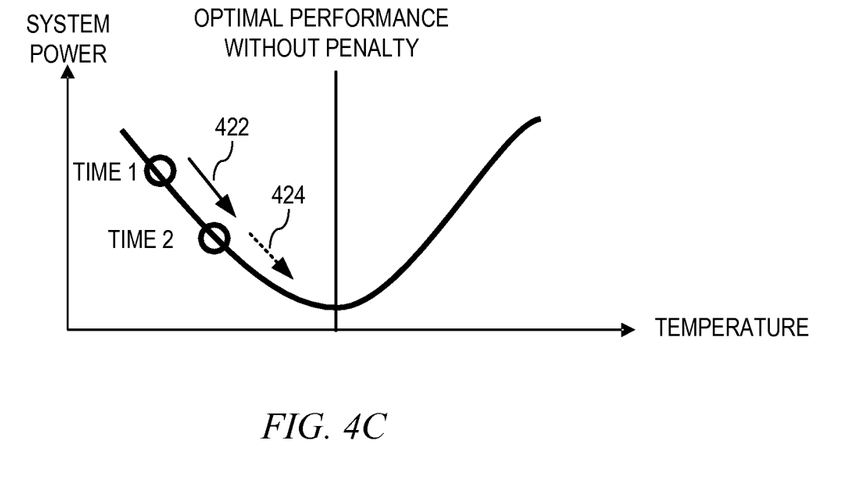
Figure 4D:
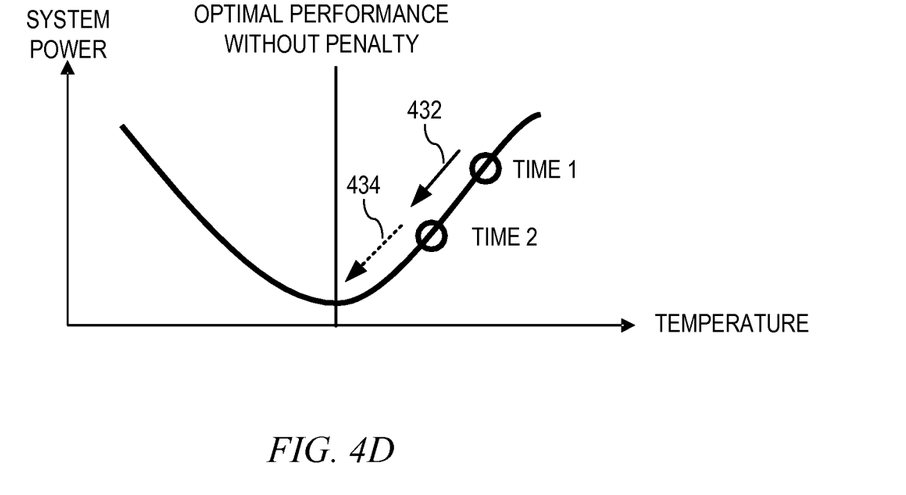

FIG. 4C depicts a graph where aggregate system power, $P_{total}$, is decreasing and temperature is increasing from Time 1 to Time 2 as shown by arrow 422. The condition illustrated in FIG. 4C may be caused by either over cooling, decreased workload, or the like, which may expend more than necessary fan power than leakage power savings. Thus, the mechanism of the illustrative embodiment would increase the thermal threshold and, by increasing the thermal threshold, indirectly decrease the fan speed in order to reduce power as is shown by arrow 424. FIG. 4D depicts a graph where aggregate system power, $P_{total}$, is decreasing and temperature is decreasing from Time 1 to Time 2 as shown by arrow 432. The condition illustrated in FIG. 4D may occur when workload drops faster than the fan speed drops, the work stays the same but the processors are still running hot and thereby increased leakage power. Thus, the mechanism of the illustrative embodiment would decrease the thermal threshold and, by decreasing the thermal threshold and with the workload decreasing, the fan speed is indirectly increased in order to reduce power as is shown by arrow 434.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination, of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5A:
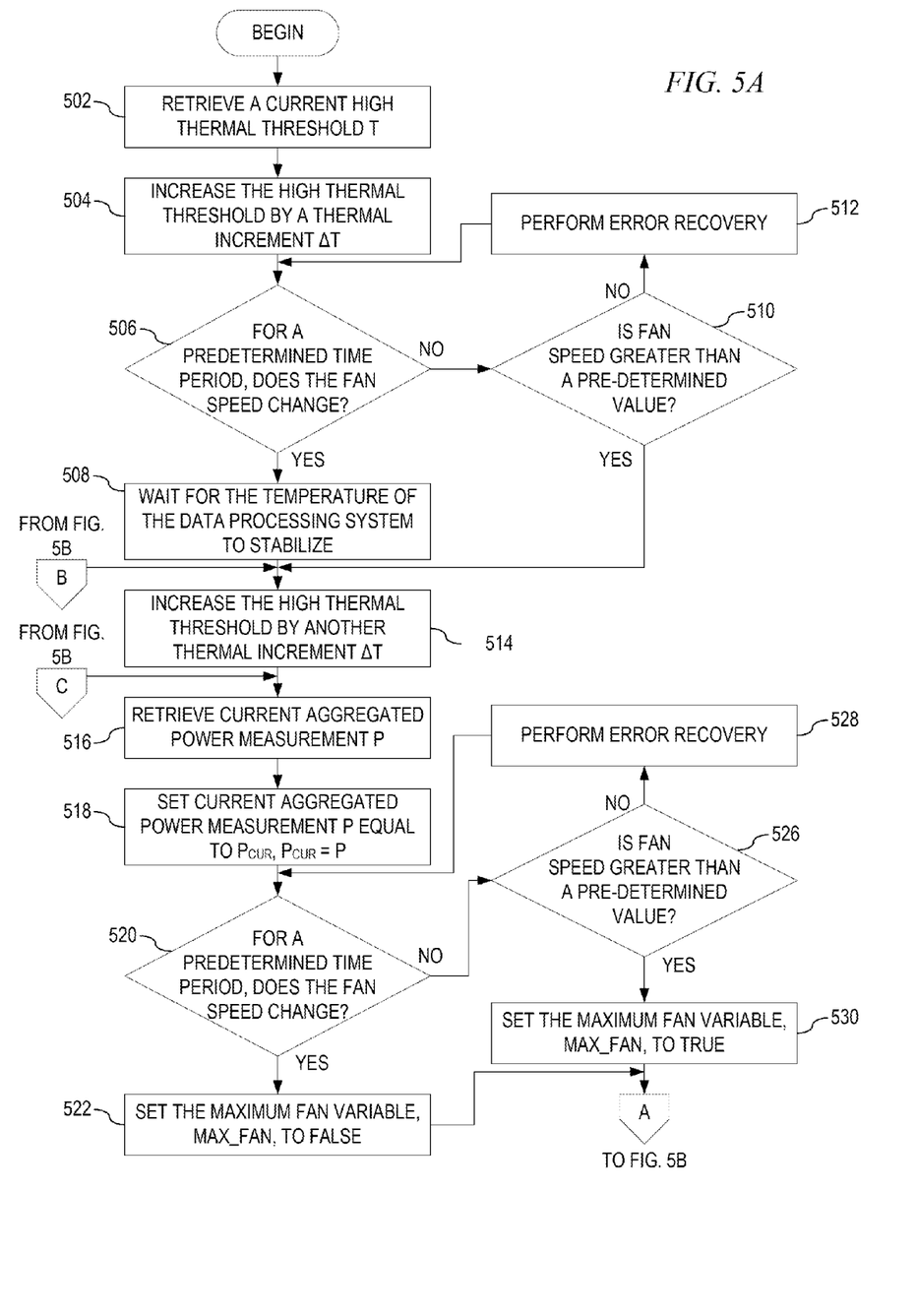
FIGS. 5A and 5B depict a flowchart outlining an exemplary operation for minimizing system power in a data processing system without performance penalty in accordance with an illustrative embodiment.
Figure 5B:
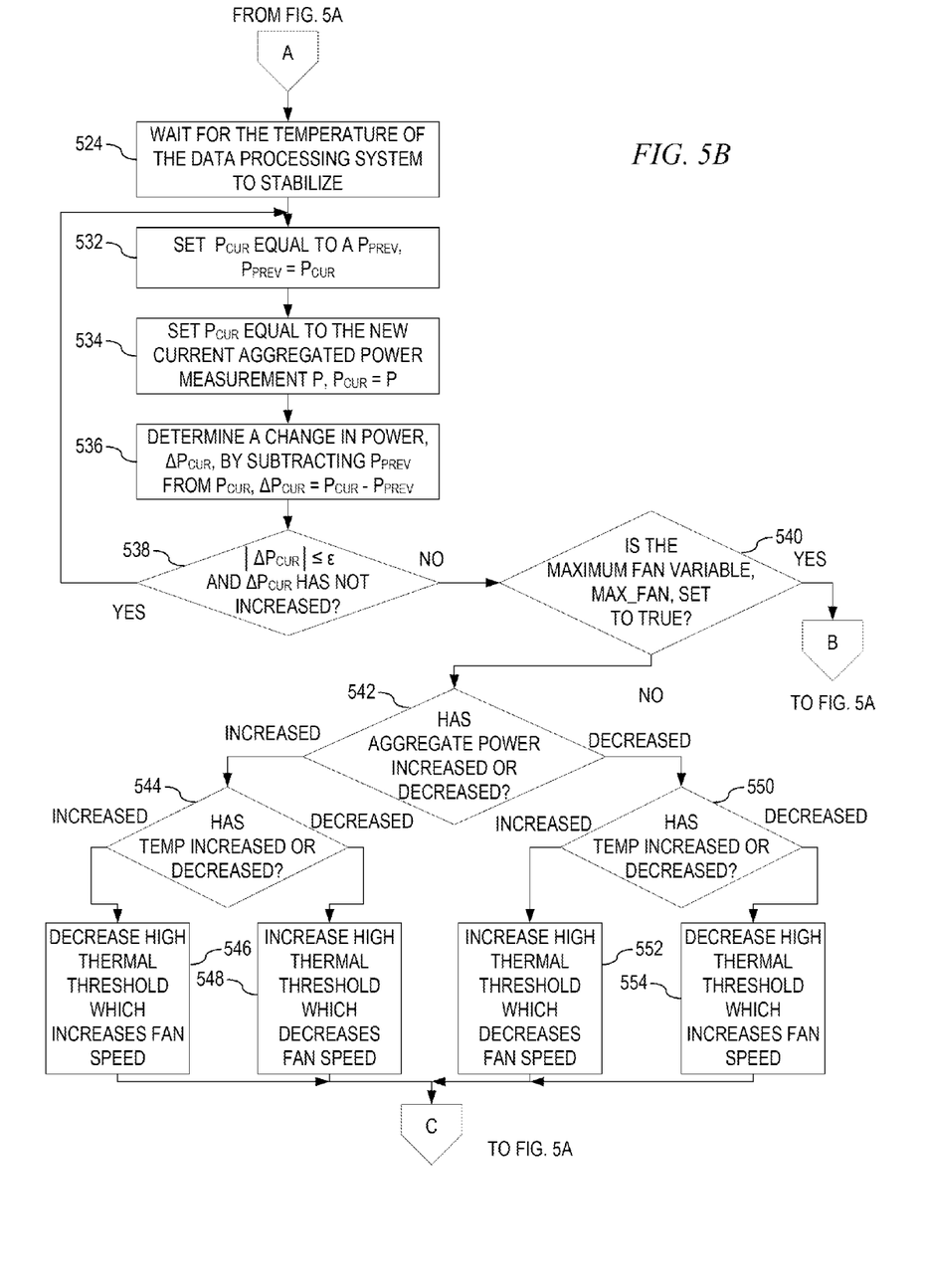

FIGS. 5A and 5B depict a flowchart outlining an exemplary operation minimizing system power in a data processing system without performance penalty in accordance with an illustrative embodiment. As the operation begins, the management control unit retrieves a current high thermal threshold T (step 502). In order to determine an optimal high thermal threshold and fan power setting that minimizes system power without performance penalty, the management control unit increases the high thermal threshold by a thermal increment ΔT (step 504). For a predetermined time interval, the management control unit determines whether the increase in the high thermal threshold causes fan speed of one or more cooling fans to change as detected by one or more power sensors (step 506). If at step 506 the management control unit determines that there is a change in fan speed, then the management control unit waits for the temperature of the data processing system to stabilize as determined by comparing the information detected by one or more thermal sensors (step 508).

If at step 506 the management control unit determines that the fan speed has not change, then the management control unit determines if the fan speed is greater than a predetermined value (step 510). If at step 510 the management control unit determines that the fan speed is not above the predetermined value, then the management control unit performs an error recovery process to ensure that the increase in the high thermal threshold indirectly caused the fan speed to increase (step 512), with the operation returning to step 506 thereafter. Once the temperature of the data processing system stabilizes at step 508 or if at step 510 the management control unit determines that fan speed is above the predetermined value, the management control unit again increases the high thermal threshold by another thermal increment ΔT (step 514). The management control unit then retrieves a current aggregated power measurement P from the one or more power sensors (step 516). The management control unit then sets the current aggregated power measurement P equal to $P_{cur}$, which is a stored value used for later comparison (step 518). For another predetermined time interval, the management control unit determines whether the additional increase in the high thermal threshold causes the fan speed of one or more cooling fans to change as detected by one or more power sensors (step 520). If at step 520 the management control unit determines that there is a change in fan speed then the management control unit sets the maximum fan flag, max_fan, to false, 0, or the like (step 522). The management control unit then waits once again for the temperature of the data processing system to stabilize as determined by comparing the information detected by one or more thermal sensors (step 524).

If at step 520 the fan speed of the one or more fans does not change in response to increasing the high thermal threshold, then the management control unit determines if the fan speed is greater than a predetermined value (step 526). If at step 526 the management control unit determines that the fan speed is not above the predetermined value, then the management control unit performs an error recovery process to ensure that the increase in the high thermal threshold indirectly caused the fan speed to increase (step 528), with the operation returning to step 520 thereafter. If at step 526 the management control unit determines that the fan speed is above the predetermined value, then the management control unit sets a maximum fan flag, max_fan, to true, 1, or the like (step 530) with the operation proceeding to step 524 thereafter. From step 524, the management control unit sets $P_{cur}$ equal to a $P_{prev}$ value (step 532) and retrieves a new current aggregated power measurement P from the one or more power sensors, which the management control unit then sets $P_{cur}$ equal to the new current aggregated power measurement P (step 534). The management control unit then determines a change in power, $\Delta P_{cur}$, by subtracting $P_{prev}$ from $P_{cur}$ (step 536). The management control unit then determines whether a convergence has been reached such that system power has been minimized without any performance penalty by determining whether an absolute value of change in power $\Delta P_{cur}$ is greater than or equal to a predefined value ε identifying optimal power settings as well as determining that change in power $\Delta P_{cur}$ does not indicate an increase in power (step 538).

If at step 538 both conditions are met, then the operation returns to step 532. If at step 538 either one of the conditions are not met or if a change in data processing system, such as a change in workload that results in $\Delta P_{cur}$ being greater than the convergence criterion, causes either of the previously met conditions to no longer be met, then the management control unit determines whether the maximum fan flag, max_fan, is set to true, 1, or the like (step 540). If at step 540 the maximum fan variable, max_fan, is set to true, 1, or the like, then the operation returns to step 514. If at step 540 maximum fan variable, max_fan, is set to false, 0, or the like, then the management control unit determines whether the aggregate system power has increased or decreased from the time at which $P_{prev}$ was obtained to the time at which $P_{cur}$ was obtained (step 542). If at step 542 the aggregate system power has increased, then the management control unit determines whether the temperature of the data processing system has increased or decreased from the time at which P was obtained to the time at which $P_{cur}$ was obtained (step 544). If at step 544 the temperature has increased, then the management control unit decreases the high thermal threshold and increases the fan speed of the data processing system (step 546), with the operation retuning to step 516 thereafter. If at step 544 the temperature has decreased, then the management control unit increases the high thermal threshold and decreases the fan speed of the data processing system (step 548), with the operation retuning to step 516 thereafter.

If at step 542 the aggregate system power has decreased, then the management control unit determines whether the temperature of the data processing system has increased or decreased from the time at which $P_{prev}$ was obtained to the time at which P was obtained (step 550). If at step 550 the temperature has increased, then the management control unit increases the high thermal threshold and decreases the fan speed of the data processing system (step 552), with the operation retuning to step 516 thereafter. If at step 550 the temperature has decreased, then the management control unit decreases the high thermal threshold and increases the fan speed of the data processing system (step 554), with the operation retuning to step 516 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for minimizing system power without performance penalty. The mechanism adjusts the systems thermal threshold at run time in order to find a fan speed at which system power is minimized without thermal violations. The mechanism monitors the aggregate system power $P_{total}$ of system power and cooling fan power for a predetermined time period. At the end of each time period, if $P_{total}$ decreases, then the mechanism may increase the current thermal threshold and decrease the fan speed to achieve more power savings. If, at the end of the time period, $P_{total}$ increases, meaning reaching a point where leakage power increase outruns fan power savings, then the mechanism may lower the thermal threshold and increase fan speed. Once $P_{total}$ stabilizes, such that there is nominal change in $P_{total}$ and virtually no performance penalty, then mechanism leaves the thermal threshold and the fan speed at the current setting indicating optimal setting has been identified that minimizes system power without performance penalty. Thus, the illustrative embodiments work regardless of workload changes, manufacturing/environmental variations, and the like, and therefore, has intrinsic adaptivity.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for minimizing system power in the data processing system, the method comprising:

determining, by a management control unit in the data processing system, a convergence has been reached in the data processing system;

responsive to convergence failing to be reached, determining, by the management control unit, whether a maximum fan flag is set to indicate that a fan is operating at a maximum speed;

responsive to the maximum fan flag failing to be set to indicate that the fan is operating at the maximum speed, either increasing or decreasing a thermal threshold of the data processing system and thereby a fan speed of the data processing system based on whether the system power of the data processing system has either increased or decreased and based on whether a temperature of the data processing system has either increased or decreased thereby fanning a new thermal threshold and a new fan speed;

determining, by the management control unit, whether the convergence has been reached in the data processing system using the new thermal threshold; and responsive to convergence failing to be reached using the new thermal threshold, repeating, by the management control unit, the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to be set to indicate that the fan is operating at the maximum speed.

2. The method of claim wherein determining whether the convergence has been reached comprises:

determining, by the management control unit, whether an absolute value of a change in the system power in the data processing system is greater than or equal to a predefined value; and determining, by the management control unit, whether the change in the system power indicates an increase in the system power of the data processing system.

3. The method of claim 2, wherein the change in the system power is determined by determining a difference between a current aggregated system power measurement and a previous aggregated system power measurement.

4. The method of claim 1, wherein the management control unit decreases the thermal threshold and thereby increases the fan speed of the data processing system in response to an aggregate system power increasing and the temperature of the data processing system increasing.

5. The method of claim 1, wherein the management control unit increases the thermal threshold and thereby decreases the fan speed of the data processing system in response to an aggregate system power increasing and the temperature of the data processing system decreasing.

6. The method of claim 1, wherein the management control unit increases the thermal threshold and thereby decreases the fan speed of the data processing system in response to an aggregate system power decreasing and the temperature of the data processing system increasing.

7. The method of claim 1, wherein the management control unit decreases the thermal threshold and thereby increases the fan speed of the data processing system in response to an aggregate system power decreasing and the temperature of the data processing system decreasing.

8. The method of claim 1, wherein the management control unit determines whether an aggregate system power has increased or decreased by comparing a first aggregate system power measurement obtained at a first time to a second aggregate system power measurement obtained at a second time.

9. The method of claim 1, wherein the management control unit determines whether the temperature of the data processing system power has increased or decreased by comparing a first aggregate system power value obtained at a first time to a second aggregate system power value obtained at a second time.

10. The method of further comprising:
responsive to the maximum fan flag being set to indicate that the fan is operating at the maximum speed, increasing, by the management control unit, the thermal threshold of the data processing system thereby forming the new thermal threshold;
determining, by the management control unit, whether the convergence has been reached in the data processing system using the new thermal threshold; and
responsive to convergence failing to be reached using the new thermal threshold, repeating, by the management control unit, the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to be set to indicate that the fan is operating at the maximum speed or increasing the thermal threshold of the data processing system thereby forming the new thermal threshold in response to the maximum fan flag being set to indicate that the fan is operating at the maximum speed.

11. The method of claim 1, wherein the maximum fan flag is set to indicate that the fan is operating at the maximum speed when a change in the thermal threshold fails to change a speed of the fan and wherein the maximum fan flag fails to be set to indicate that the fan is operating at the maximum speed when the change in the thermal threshold changes the speed of the fan.

12. A non-transitory computer program product comprising a computer readable storage medium having a computer readable program stored therein, wherein the computer readable program, when executed on a computing device, causes the computing device to:
determine whether a convergence has been reached in a data processing system;
responsive to convergence failing to be reached, determine whether a maximum fan flag is set to indicate that a fan is operating at a maximum speed;
responsive to the maximum fan flag failing to he set to indicate that the fan is operating at the maximum speed, either increasing or decreasing a thermal threshold of the data processing system and thereby a fan speed of the data processing system based on whether a system power of the data processing system has either increased or decreased and based on whether a temperature of the data processing system has either increased or decreased thereby forming a new thermal threshold and a new fan speed;
determine whether the convergence has been reached in the data processing system using the new thermal threshold; and
responsive to convergence failing to be reached using the new thermal threshold, repeat the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to be set to indicate that the fan is operating at the maximum speed.

13. The computer program product of claim 12, wherein the computer readable program to determine whether the convergence has been reached further causes the computing device to:
determine whether an absolute value of a change in the system power in the data processing system is greater than or equal to a predefined value; and
determine whether the change in the system power indicates an increase in the system power of the data processing system.

14. The computer program product of claim 13, wherein the change in the system power is determined by determining a difference between a current aggregated system power measurement and a previous aggregated system power measurement.

15. The computer program product of claim 12, wherein the computer readable program decreases the thermal threshold and thereby increases the fan speed of the data processing system in response to an aggregate system power increasing and the temperature of the data processing system increasing, wherein the computer readable program increases the thermal threshold and thereby decreases the fan speed of the data processing system in response to the aggregate system power increasing and the temperature of the data processing system decreasing, wherein the computer readable program causes increases the thermal threshold and thereby decreases the fan speed of the data processing system in response to the aggregate system power decreasing and the temperature of the data processing system increasing, and wherein the computer readable program decreases the thermal threshold and thereby increases the fan speed of the data processing system in response to the aggregate system power decreasing and the temperature of the data processing system decreasing.

16. The computer program product of claim 12, wherein the computer readable program determines whether an aggregate system power has increased or decreased by comparing a lust aggregate system power measurement obtained at a first time to a second aggregate system power measurement obtained at a second time.

17. The computer program product of claim 12, wherein the computer readable program determines whether the temperature of the data processing system power has increased or decreased by comparing a first aggregate system power value obtained at a first time to a second aggregate system power value obtained at a second time.

18. The computer program product of claim 12, wherein the computer readable program further causes the computing device to:
responsive to the maximum fan flag being set to indicate that the fan is operating at the maximum speed, increase the thermal threshold of the data processing system thereby forming the new thermal threshold;
determine whether the convergence has been reached in the data processing system using the new thermal threshold; and
responsive to convergence failing to be reached using the new thermal threshold, repeat the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to he set to indicate that the fan is operating at the maximum speed or increasing the thermal threshold of the data processing system thereby forming the new thermal threshold in response to the maximum fan flag being set to indicate that the fan is operating at the maximum speed.

19. The computer program product of claim 12, wherein the maximum fan flag is set to indicate that the fan is operating at the maximum speed when a change in the thermal threshold fails to change a speed of the fan and wherein the maximum fan flag fails to he set to indicate that the fan is operating at the maximum speed when the change in the thermal threshold changes the speed of the fan.

20. An apparatus, comprising:
   a processor: and
   a memory coupled to the processor, wherein the memory comprises instructions which, when executed by the processor, cause the processor to:
   determine whether a convergence has been reached in a data processing system;
   responsive to convergence failing to he reached, determine whether a maximum fan flag is set to indicate that a fan is operating at a maximum speed;
   responsive to the maximum fan flag failing to be set to indicate that the fan is operating at the maximum speed, either increasing or decreasing a thermal threshold of the data processing system and thereby a fan speed of the data processing system based on whether a system power of the data processing system has either increased or decreased and based on whether a temperature of the data processing system has either increased or decreased thereby forming a new thermal threshold and a new fan speed;
   determine whether the convergence has been reached in the date processing system using the new thermal threshold; and
   responsive to convergence failing to he reached using the new thermal threshold., repeat the steps of determining whether the maximum fan flag is set to indicate that the fan is operating at the maximum speed and either increasing or decreasing the thermal threshold of the data processing system and thereby the fan speed of the data processing system until convergence has been reached in response to the maximum fan flag failing to he set to indicate that the fan is operating at the maximum speed.

* * * * *